US009547858B2

(12) United States Patent
Karkhanis et al.

(10) Patent No.: US 9,547,858 B2
(45) Date of Patent: Jan. 17, 2017

(54) REAL-TIME MULTI MASTER TRANSACTION

(71) Applicant: Bank of America Corporation, Charlotte, NC (US)

(72) Inventors: Kiran Arun Karkhanis, Hillsborough, NJ (US); Edison M. Castro, Lawrenceville, NJ (US); Vasantha Kumar, Princeton, NJ (US); Louis Tevere, Wyncote, PA (US)

(73) Assignee: Bank of America Corporation, Charlotte, NC (US)

( * ) Notice: Subject to any disclaimer, the term of this patent is extended or adjusted under 35 U.S.C. 154(b) by 206 days.

(21) Appl. No.: 13/687,774

(22) Filed: Nov. 28, 2012

(65) Prior Publication Data

US 2014/0149280 A1    May 29, 2014

(51) Int. Cl.
*G06Q 40/00* (2012.01)
*G06Q 20/38* (2012.01)
*G06Q 40/02* (2012.01)
*H04L 9/32* (2006.01)

(52) U.S. Cl.
CPC .............. *G06Q 20/38* (2013.01); *G06Q 40/02* (2013.01); *H04L 9/32* (2013.01)

(58) Field of Classification Search
CPC ................................ G06Q 20/02; G06Q 20/12
USPC .................. 705/35, 39, 37, 38, 44
See application file for complete search history.

(56) References Cited

U.S. PATENT DOCUMENTS

| | | | |
|---|---|---|---|
| 6,374,329 B1 | 4/2002 | McKinney et al. | |
| 7,069,267 B2 | 6/2006 | Spencer, Jr. | |
| 7,600,148 B1 | 10/2009 | Shaw et al. | |
| 7,685,465 B1 | 3/2010 | Shaw et al. | |
| 7,747,898 B1 | 6/2010 | Shaw et al. | |
| 7,890,626 B1 | 2/2011 | Gadir | |
| 7,925,624 B2 | 4/2011 | Vosshall et al. | |
| 8,015,110 B2 * | 9/2011 | Sims et al. ...................... | 705/40 |
| 8,099,499 B2 | 1/2012 | Oeda | |
| 8,223,777 B2 | 7/2012 | Krishnamoorthy et al. | |
| 2002/0194324 A1 | 12/2002 | Guha | |
| 2005/0091396 A1 | 4/2005 | Nilakantan et al. | |
| 2006/0193252 A1 | 8/2006 | Naseh et al. | |
| 2006/0195607 A1 | 8/2006 | Naseh et al. | |
| 2006/0248371 A1 | 11/2006 | Chen et al. | |
| 2007/0067435 A1 | 3/2007 | Landis et al. | |
| 2007/0294563 A1 | 12/2007 | Bose | |

(Continued)

*Primary Examiner* — Jagdish Patel
(74) *Attorney, Agent, or Firm* — Michael A. Springs

(57) ABSTRACT

According to some embodiments, a system comprises a plurality of data centers communicatively coupled by a network. The data centers include an assigned data center and a second data center. The assigned data center receives a request for a session, determines the session passes authentication, and communicates session information to the second data center indicating the session passes authentication. The assigned data center also receives a first message comprising a first portion of transaction information and communicates synchronization data for replicating the first portion of transaction information at the second data center. The second data center receives a second message comprising a second portion of transaction information. The system facilitates a financial transaction in real-time based on the first portion and the second portion of transaction information.

15 Claims, 3 Drawing Sheets

(56) References Cited

U.S. PATENT DOCUMENTS

2011/0302057 A1* 12/2011 Karon et al. ................ 705/27.1
2012/0330842 A1* 12/2012 Heit .............................. 705/45
2013/0138547 A1*  5/2013 Claus et al. ................... 705/37
2014/0012736 A1*  1/2014 Ross, II ......................... 705/38

* cited by examiner

REAL-TIME MULTI MASTER TRANSACTION

TECHNICAL FIELD OF THE INVENTION

The present invention relates generally to an online financial transaction and more specifically to a real-time multi master transaction.

BACKGROUND OF THE INVENTION

A financial provider, such as a bank, a broker, or an investment company, may provide online services that allow customers to conduct financial transactions. Examples of financial transactions include buying and selling shares of stock. The financial provider may use a data center to facilitate the financial transactions. A data center may comprise one or more servers, databases, and/or other computing resources configured to respond to requests initiated by customers via the Internet or other suitable network.

SUMMARY OF THE INVENTION

According to some embodiments, a system comprises a plurality of data centers communicatively coupled by a network. The data centers include an assigned data center and a second data center. The assigned data center receives a request for a session, determines the session passes authentication, and communicates session information to the second data center indicating the session passes authentication. The assigned data center also receives a first message comprising a first portion of transaction information and communicates synchronization data for replicating the first portion of transaction information at the second data center. The second data center receives a second message comprising a second portion of transaction information. The system facilitates a financial transaction in real-time based on the first portion and the second portion of transaction information.

Certain embodiments of the invention may provide one or more technical advantages. In some embodiments, transaction information received by a first data center may be replicated in a second data center in real-time. Thus, if a session gets bounced from the first data center to the second data center mid-transaction, the second data center can use the replicated transaction information to proceed with the transaction efficiently. Similarly, in some embodiments, session information indicating that the first data center has authenticated the session can be communicated to the second data center in real-time. Thus, if the session gets bounced from the first data center to the second data center mid-session, the second data center can continue the session efficiently without requiring the user to re-authenticate. Accordingly, delays associated with a session bouncing from one data center to another may be reduced or eliminated.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE INVENTION

Figure 1A:
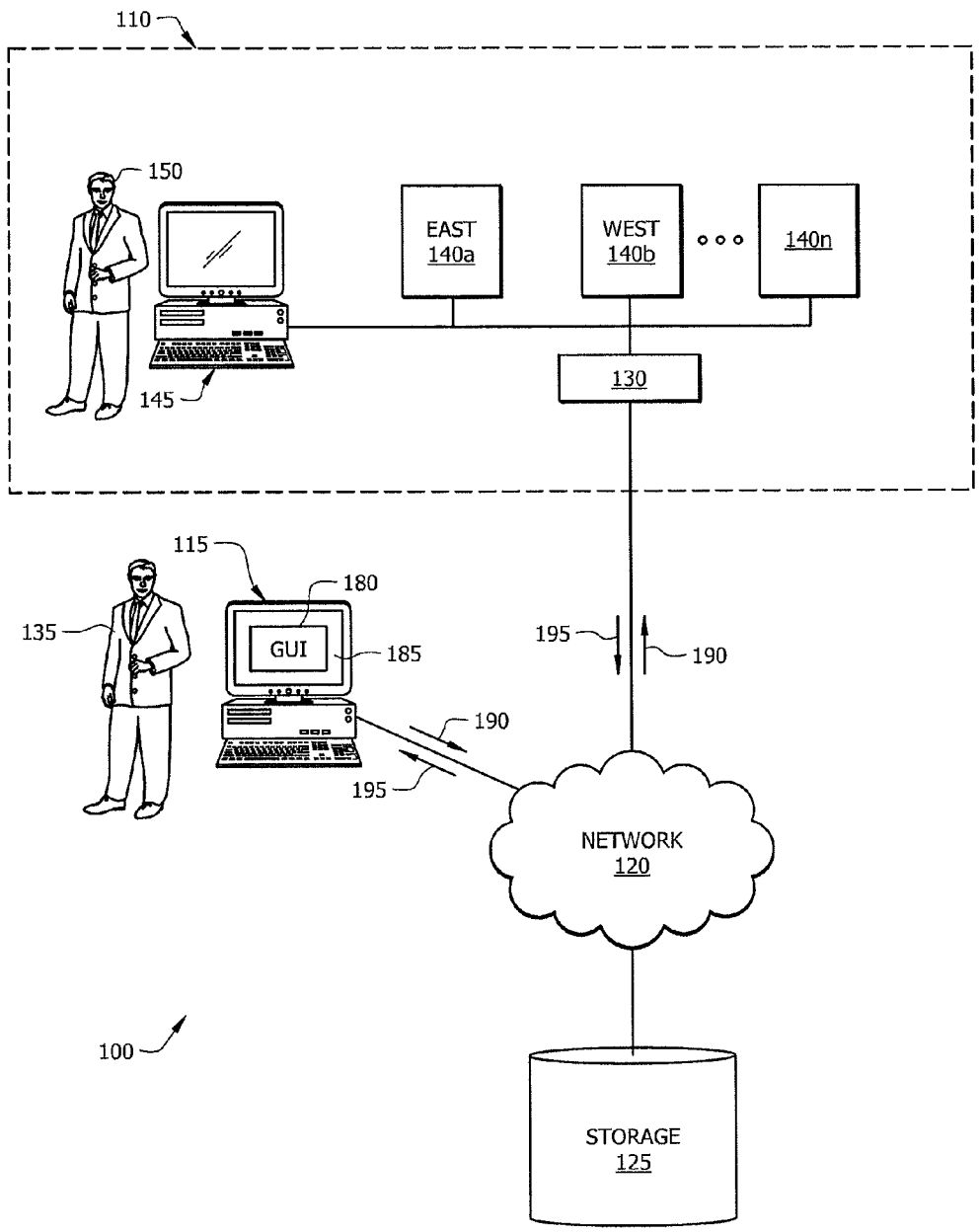
FIG. 1A illustrates an example of a system for facilitating a real-time multi master transaction.
Figure 1B:
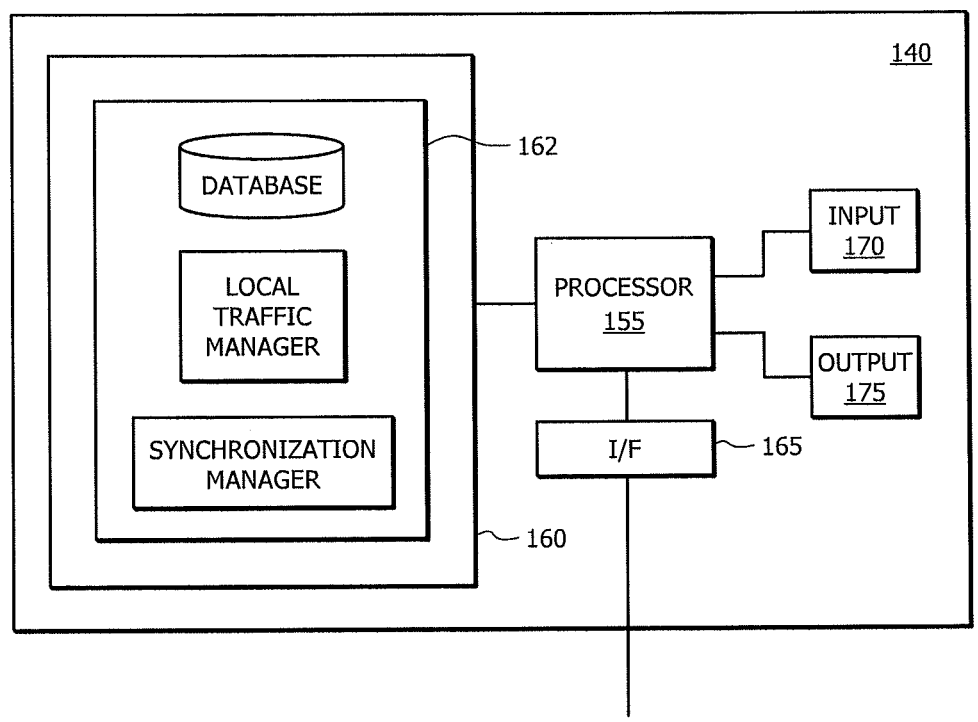
FIG. 1B illustrates an example of a data center described with respect to the system of FIG. 1A.
Figure 2:
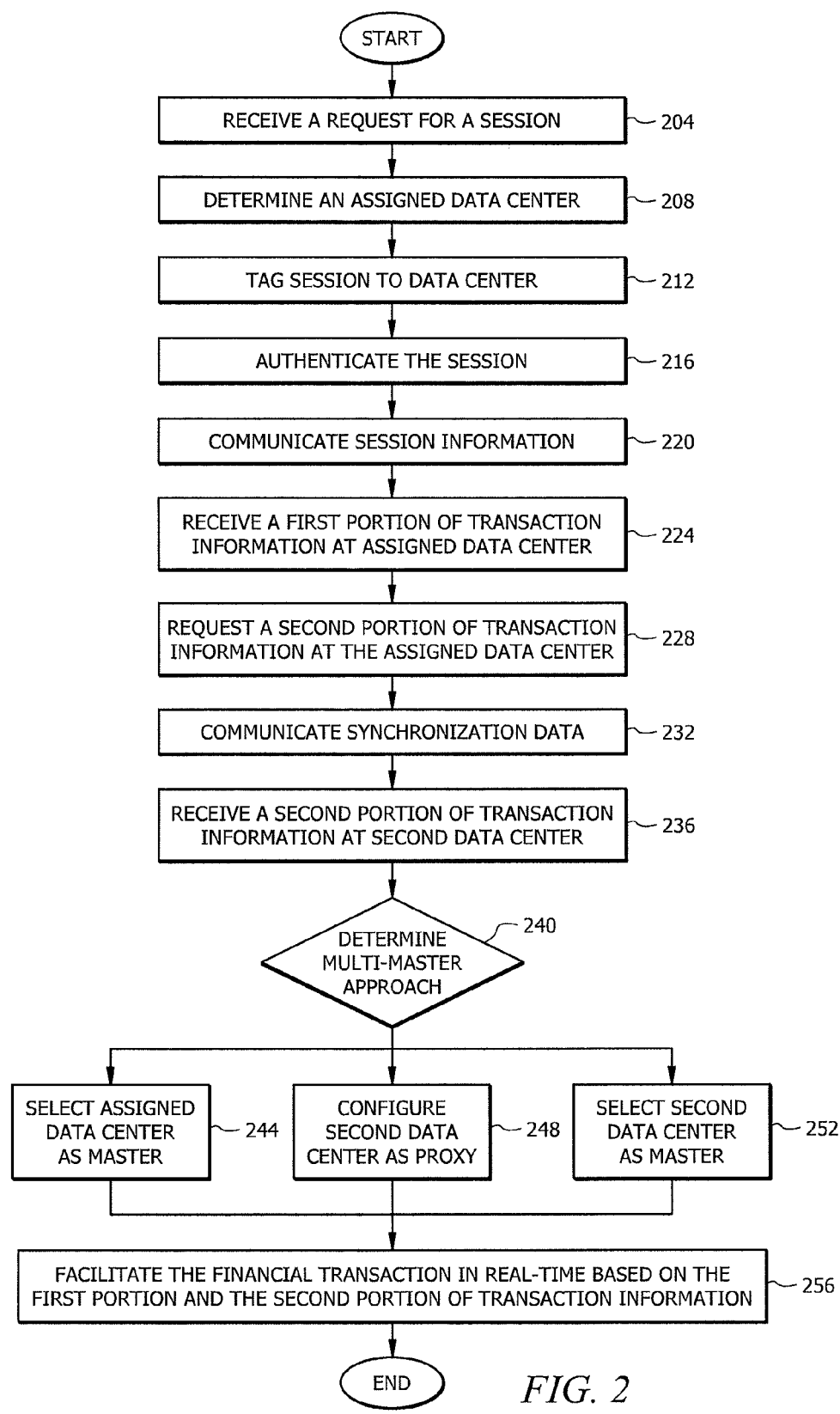
FIG. 2 illustrates an example of a method for facilitating a real-time multi master transaction.

Embodiments of the present invention and its advantages are best understood by referring to FIGS. 1 through 2 of the drawings, like numerals being used for like and corresponding parts of the various drawings.

A financial provider, such as a bank, a broker, or an investment company, may provide online services that allow customers to conduct financial transactions. Examples of financial transactions include buying and selling shares of stock. The financial provider may use a data center to facilitate the financial transactions. A data center may comprise one or more servers, databases, and/or other computing resources configured to respond to requests initiated by customers via the Internet or other suitable network.

Customers expect financial transactions to be conducted efficiently. However, a financial transaction may experience delays if the customer is located far away from the data center that facilitates the transaction. Accordingly, in some embodiments, delays may be minimized by assigning the customer to a closer data center. Even if the customer is assigned to a closer data center, the session may get bounced to a more distant data center mid-session and/or mid-transaction, for example, if the assigned data center fails or if the Internet misbehaves. Delays associated with the added message travel time to the distant data center may be compounded if the distant data center also has to obtain information about the session and the transaction from the customer after getting bounced. For example, the distant data center may require time to re-authenticate the session and to receive information about the transaction that was previously provided to the assigned data center. Certain embodiments of the present invention may reduce or eliminate such delays by proactively providing session and/or transaction information to the distant data center in real-time (i.e., as the information becomes available). Because the distant data center receives information prior to the session getting bounced, it may be able to seamlessly resume the transaction at the point where the assigned data center left off.

FIG. 1A illustrates a system 100 according to certain embodiments. System 100 may include financial provider 110, one or more user devices 115, a network storage device 125, a plurality of data centers 140 associated with financial provider 110, and one or more users 135. Financial provider 110, user devices 115, and network storage device 125 may be communicatively coupled by a network 120. System 100 may facilitate a financial transaction for user 135.

In general, user 135 utilizes user device 115 to interact with data center 140 to request a financial transaction. For example, user 135 provides a request(s) 190 to data center 140 utilizing user device 115. In some embodiments, request 190 includes information for establishing a session with financial provider 110, such as a login name and/or password for an online account belonging to user 135. Once the session has been established, user 135 may initiate one or more subsequent requests 190 that include information describing the requested financial transaction. For example, request 190 may request to trade shares of stock. Accordingly, in the example, one or more requests 190 may be communicated in order to indicate the number of shares, the name of the stock, whether to buy or sell the stock, whether to accept the financial transaction configured in a prior request 190, or other suitable information.

User device 115 may refer to any device that enables user 135 to interact with data center 140. In some embodiments, user device 115 may include a computer, workstation, telephone, Internet browser, electronic notebook, Personal Digital Assistant (PDA), pager, Automatic Teller Machine (ATM) or any other suitable device (wireless, wireline, or otherwise), component, or element capable of receiving, processing, storing, and/or communicating information with other components of system 100. User device 115 may also comprise any suitable user interface such as a display 185, microphone, keyboard, credit card reader, check reader, or any other appropriate terminal equipment usable by a user 135. It will be understood that system 100 may comprise any number and combination of user devices 115.

In some embodiments, user device 115 may include a graphical user interface (GUI) 180. GUI 180 is generally operable to tailor and filter data entered by and presented to user 135. GUI 180 may provide user 135 with an efficient and user-friendly presentation of request 190 and/or response 195. GUI 180 may comprise a plurality of displays having interactive fields, pull-down lists, and buttons operated by user 135. GUI 180 may include multiple levels of abstraction including groupings and boundaries. It should be understood that the term GUI 180 may be used in the singular or in the plural to describe one or more GUIs 180 and each of the displays of a particular GUI 180.

In some embodiments, network storage device 125 may refer to any suitable device communicatively coupled to network 120 and capable of storing and facilitating retrieval of data and/or instructions. Examples of network storage device 125 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or or any other volatile or non-volatile, non-transitory computer-readable memory devices that store one or more files, lists, tables, or other arrangements of information. Network storage device 125 may store any data and/or instructions utilized by data center 140.

In certain embodiments, network 120 may refer to any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, system 100 includes a global traffic manager (GTM) 130. GTM 130 may receive request 190 from user device 115 requesting a session. GTM 130 may assign the session to one of the data centers 140 to make that data center the "assigned data center" for the session. In some embodiments, GTM 130 assigns the session to the nearest data center 140. As an example, GTM 130 may analyze information associated with user device 115, such as a DNS address, to determine the geographical location of user device 115. GTM 130 may then assign user device 115 to a nearby data center 140. As an example, suppose financial provider 110 maintains one data center 140a on the East Coast and a second data center 140b on the West Coast. If GTM 130 determines that user device 115 is located in California, GTM 130 may assign the session to data center 140b on the West Coast. Assigning user device 115 to a nearby data center may reduce latencies associated with message travel time. Although in the preceding example GTM 130 assigned data center 140 based on geographical location, GTM 130 may also take other factors into consideration when performing an assignment, such as the current status of each data center 140 (e.g., active or failed) and load-balancing considerations (e.g., available or overloaded).

Once a data center 140 has been assigned, a tag may be generated indicating the assigned data center 140 for the session. As an example, a tag may comprise a cookie with text indicating which data center 140 is the assigned data center. When a data center 140 receives a message associated with a tag, data center 140 may use the tag to determine if it is the assigned data center or if another data center 140 is the assigned data center. In the above example, if the East Coast data center 140a receives a message indicating that the West Coast data center 140b is the assigned data center, the East Coast data center 140a may use that information to determine how to handle the message as discussed in more detail with respect to FIG. 2 below.

In some embodiments, financial provider 110 may refer to a bank, a broker, an investment company, or other entity. Financial provider 110 may be associated with a plurality of data centers 140, an operator workstation 145, and an operator 150. In some embodiments, a tunnel 142 may communicatively couple a first data center 140a to a second data center 140b. Tunnel 142 may allow for efficient communication between the data centers 140. In some embodiments, tunnel 142 comprises direct network links capable of handling network and/or storage traffic, such as a GRE Tunnel, a direct WAN LINK between the data centers, or other suitable tunnel. In some embodiments, tunnel 142 may facilitate proxy operations. For example, first data center 140a may interface with user device 115 as a proxy on behalf of second data center 140b. Accordingly, user device 115 may send a message to first data center 140a and first data center 140a may forward the message to second data center 140b via tunnel 142. Similarly, second data center 140b may send a message to first data center 140a via tunnel 142 and first data center 140a may forward the message to user device 115.

In some embodiments, data center 140 may refer to any suitable combination of hardware and/or software implemented in one or more modules to process data and provide the described functions and operations. In some embodiments, the functions and operations described herein may be performed by a pool of data centers 140. In some embodiments, data center 140 may include, for example, a mainframe, server, host computer, workstation, web server, file server, or any other suitable device operable to process data. In some embodiments, data center 140 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems.

FIG. 1B illustrates an example of a data center described with respect to the system of FIG. 1A. In some embodiments, data centers 140 may include a processor 155, data center memory 160, an interface 165, an input 170, and an output 175. Data center memory 160 may refer to any suitable device capable of storing and facilitating retrieval of data and/or instructions. Examples of data center memory 160 include computer memory (for example, RAM or ROM), mass storage media (for example, a hard disk), removable storage media (for example, a CD or a DVD), database and/or network storage (for example, a server), and/or or any other volatile or non-volatile, non-transitory computer-readable memory devices that store one or more files, lists, tables, or other arrangements of information. Although FIG. 1B illustrates data center memory 160 as internal to data center 140, it should be understood that data center memory 160 may be internal or external to data center 140, depending on particular implementations. Also, data center memory 160 may be separate from or integral to other memory devices to achieve any suitable arrangement of memory devices for use in system 100.

Data center memory 160 is generally operable to store one or more applications 162. An application 162 generally refers to logic, rules, algorithms, code, tables, and/or other suitable instructions for performing the described functions and operations. In some embodiments, applications 162 facilitate a financial transaction, as discussed in more detail with respect to FIG. 2 below. Examples of applications 162 include one or more local traffic manager(s), synchronization manager(s), and database(s). The local traffic manager may manage traffic for a particular data center 140. For example, local traffic manager may perform load balancing in order to distribute the load among the computing resources of data center 140. In some embodiments, local traffic manager may also include logic for receiving a message and determining the assigned data center 140.

The synchronization manager may synchronize the data in a first database (database A) with the data in a second database (database B) in real-time (as the information becomes available). Synchronization may refer to replicating the data so that each database has access to the same information. Thus, synchronization data comprises data communicated to inform one database of the contents of another database so that updates can be made to keep the data the same across multiple databases. In some embodiments, database A may be associated with a first data center 140 (e.g., the assigned data center) and database B may be associated with a second data center 140. If the session gets bounced from the assigned data center 140, the second data center 140 may continue transacting the session in real-time by making use of the synchronization data. Examples of reasons that the session may get bounced include a failure at the assigned data center 140 or the Internet misbehaving and sending the message to the wrong data center 140.

In some embodiments, the synchronization manger communicates synchronization data using asynchronous messaging. Asynchronous messaging may be implemented using 'message queues' at two or more endpoints, such as at database A and database B. For some transactions, database A may be configured to originate the transaction (SENDER) and database B may be configured as a remote database that needs to be kept in sync (RECEIVER). Messages comprising data that needs to be kept in sync may be tagged as part of a 'transaction' using tags that identify them as part of a 'dialog.' All messages within a dialog may be assigned a sequence number (at the SENDER) that determines the order in which the RECEIVER should process the messages. These messages may then be dropped into a queue associated with the SENDER, such as the SENDER's SendQueue, to be sent asynchronously to the RECEIVER. By sending the messages asynchronously, the SENDER may proceed with processing other transactions without having to pause or hold the other transactions in a cache waiting for the receiver to process the messages. In other words, the SENDER may use a 'fire and forget' approach to generate the messages and put them in the queue. Once the messages are in the queue, the SENDER can start processing other transactions. The RECEIVER processes the messages by reading them from its local queue, such as the RECEIVER's ReceiveQueue, according to the sequence number (i.e., in the order that the SENDER specified).

Data center memory 160 communicatively couples to processor 155. Processor 155 is generally operable to execute application 162 stored in data center memory 160 to facilitate a transaction according to the disclosure. Processor 155 may comprise any suitable combination of hardware and software implemented in one or more modules to execute instructions and manipulate data to perform the described functions for data centers 140. In some embodiments, processor 155 may include, for example, one or more computers, one or more central processing units (CPUs), one or more microprocessors, one or more applications, and/or other logic.

In some embodiments, communication interface 165 (I/F) is communicatively coupled to processor 155 and may refer to any suitable device operable to receive input for data center 140, send output from data center 140, perform suitable processing of the input or output or both, communicate to other devices, or any combination of the preceding. Communication interface 165 may include appropriate hardware (e.g., modem, network interface card, etc.) and software, including protocol conversion and data processing capabilities, to communicate through network 120 or other communication system, which allows data center 140 to communicate to other devices. Communication interface 165 may include any suitable software operable to access data from various devices such as user devices 115 and/or network storage device 125. Communication interface 165 may also include any suitable software operable to transmit data to various devices such as user devices 115 and/or network storage device 125. Communication interface 165 may include one or more ports, conversion software, or both. In general, communication interface 165 receives request 190 from user devices 115 and transmits response 195 to user devices 115.

In some embodiments, input device 170 may refer to any suitable device operable to input, select, and/or manipulate various data and information. Input device 170 may include, for example, a keyboard, mouse, graphics tablet, joystick, light pen, microphone, scanner, or other suitable input device. Output device 175 may refer to any suitable device operable for displaying information to a user. Output device 175 may include, for example, a video display, a printer, a plotter, or other suitable output device.

In general, operator 150 may interact with data center 140 using an operator workstation 145. In some embodiments, operator workstation 145 may be communicatively coupled to data center 140 and may refer to any suitable computing system, workstation, personal computer such as a laptop, or any other device operable to process data. In certain embodiments, an operator 150 may utilize operator workstation 145 to manage data center 140 and any of the data stored in data center memory 160 and/or network storage device 125.

In operation, application 162, upon execution by processor 155, facilitates a financial transaction. For example, application 162 receives request 190 to facilitate a transaction associated with user 135. Request 190 may be initiated by user 135. Application 162 determines the requested transaction and communicates response 195. In some embodiments, response 195 indicates that the transaction has been accepted, denied, or requires further input from user 135. FIG. 2 provides a more detailed example of a transaction that may be performed using application 162.

FIG. 2 illustrates an example of a method 200 for facilitating a real-time multi master transaction. The method begins at step 204 where financial provider 110 receives request 190a from user device 115. Request 190a may request a session with financial provider 110, for example, by providing login credentials for an online account associated with user 135 of device 115. In some embodiments, financial provider 110 may receive request 190a at global traffic manager (GTM) 130.

At step 208, GTM 130 determines an assigned data center 140 for the session. The assigned data center 140 is determined from a plurality of data centers 140 associated with financial provider 110. GTM 130 may choose the assigned data center 140 using logic configured to reduce the amount of delay in performing transactions. For example, GTM 130 may assign data center 140 based on geographical proximity, the current status of each data center 140 (e.g., active or failed), and the current load on each data center 140. In some embodiments GTM 130 determines the geographical location of user device 115 that initiated request 190a. Geographical location may be determined in any suitable manner, such as according to DNS address information. GTM 130 may assign a data center 140 located relatively near user device 115. As an example, it may be more efficient for user device 115 located in California to access a West Coast data center 140b rather than an East Coast data center 140a. GTM 130 may take other factors into consideration. For example, if the West Coast data center 140b is overloaded and performing slowly while a data center 140c located in Nevada is lightly loaded, GTM 130 may assign the session to data center 140c. Local traffic managers associated with particular data centers can perform further load balancing, for example, to assign the session to a particular server of the assigned data center.

GTM 130 may tag the session to the assigned data center 140 in step 212. In some alternate embodiments, GTM 130 may direct the session to a data center 140, and the local traffic manager may tag the session. In some embodiments, the tag may comprise a cookie with text indicating which data center 140 is the assigned data center. In some optional embodiments, the tag may include additional assignment information, for example, the local traffic manager may assign the session to certain computing resources, such as a server or database of the assigned data center. For purposes of example, suppose the session is tagged to the West Coast data center 140b as the assigned data center.

In step 216, West Coast data center 140b may authenticate the session. Authentication may include verifying the login credentials that user device 115 provided in the request. In some embodiments, West Coast data center 140b may also perform authorization to confirm which resources user 135 may access. For example, the authorization may determine a financial account linked to user 135 that user 135 is authorized to use for financial transactions. In some embodiments, West Coast data center may communicate a response 195a indicating whether the session has been established.

West Coast data center 140b communicates session information at step 220. Session information indicates that the session passes authentication. West Coast data center 140b may communicate the session information to East Coast data center 140a and/or any other data centers 140 associated with financial provider 110. Thus, if the session subsequently gets bounced to one of the other data centers 140, the session may continue without the other data center 140 having to perform authentication again. Accordingly, delays associated with a session bounce may be minimized and user experience may be improved.

At step 224, West Coast data center 140 (the assigned data center) receives another request 190b from user device 115 requesting a financial transaction. Request 190b may comprise a first portion of transaction information. As an example, request 190b may request "purchase X shares of [Company Name] stock." In some embodiments, West Coast data center 140 may send response 195b to user device 115 soliciting a second portion of transaction data at step 228. As an example, response 195b may ask "are you sure that you want to purchase X shares of [Company Name] stock?"

West Coast data center 140 communicates synchronization data to one or more of the other data centers 140 at step 232. The synchronization data may be configured to replicate the first portion of transaction data at the other data centers 140. For example, the synchronization data may indicate that user 135 has initiated a pending request to purchase X shares of [Company Name] stock.

In some embodiments, queues may be used to facilitate synchronization of the data between different databases associated with different data centers 140. In some embodiments, queues associated with every member server are configured to do multi-master replication to each other server. Examples of a server include an SQL server or other database server, and each server may be configured with the following queues: DistributionReceive, DistributionSend, Send, and Receive. In some embodiments, broker technology, such as SQL broker, may be used to configure the queues. One set of queues (DistributionReceive, DistributionSend) may do the hardening and multicasting of the messages. The other set of queues (Send, Receive) may do the actual sends and receives to and from remote locations. The queues allow for ACID (Atomicity, Consistency, Isolation, Durability) transactions, where a transaction may be committed in the local store and then in each of the remote stores. The queuing system may use a combination of TCP and SQL transaction traffic to keep communication overhead to a minimum while keeping the transaction process intact. The queuing system may provide a loosely coupled system that makes no differentiation between senders and receivers. Furthermore, it may allow senders and receivers to have flexibility with respect to the manner that messages are handled. The messages can be read and received one or many at a time, and subsequent messages may be sent without having to wait for receivers to finish reading the previous message.

The basic operation of the queue architecture may be based on stored procedure activation. For example, in an SQL Broker or other database broker, activation may allow a process (stored procedure, external component, etc.) to be activated or called when a message arrives. A determination may be made whether to reuse a current activation process or to create a new one, and the activation process may determine the viability of the process to handle the message. In some embodiments, if the rate of messaging is faster than the rate of processing the messages, more than one process may be activated. The number of processes may be scaled in response to changes in the messaging rate in order to provide a sufficient processing rate while at the same time minimizing resource usage (e.g., fewer resources may be used during the times that the messaging rate is relatively low). Each queue may have a stored activation procedure with a unique function:

a. DistributionSendQueue—When a message is sent through this queue, the system looks up configuration information to understand the queue/transaction topology. The system looks up remote queuing partners (servers) that the message needs to be sent to. Upon determining every endpoint that the message needs to be sent to, the system uses the SendQueue to send each one the appropriate endpoints a copy of the original message. In some embodiments this allows for multicasting where one message can propagate the same transaction to many other systems.

b. DistributionReceiveQueue—This part of the system may allow for transaction synchronization. When a message is sent, the sender needs to receive an acknowledgment indicating that the receiver got the message and processed it properly. The acknowledgement indicates the message was resolved according to ACID, that is, that the transaction has been semantically completed.

c. SendQueue—Responsible for doing the actual multicasting verification.

d. ReceiveQueue—Responsible for receiving messages from other systems and successfully applying the messages to the local database. On successful completion of the local transaction, acknowledgements are sent to the source system in order to complete the transaction.

As an example, suppose:

System A comprises DistributionSendQueue A, DistributionReceiveQueue A, Send Queue A, and ReceiveQueue A (e.g., the queues may be associated with any suitable component and/or sub-component of system A, such as endpoint A, database A, and/or server A).

System B comprises DistributionSendQueue B, DistributionReceiveQueue B, SendQueue B, and ReceiveQueue B (e.g., the queues may be associated with any suitable component and/or sub-component of system B, such as endpoint B, database B, and/or server B).

An example message flow for the queues may be as follows:

(1) System A generates a message.
(2) System A provides the message to DistributionSendQueue A.
(3) DistributionSendQueue A determines that the message should be sent to System B.
(4) SendQueue A then sends the message to System B.
(5) System B receives the message at ReceiveQueue B and processes the message.
(6) System B generates an acknowledgement.
(7) System B uses SendQueue B to send the acknowledgement to System A.
(8) System A receives the acknowledgement at ReceiveQueue A.
(9) ReceiveQueue A provides the acknowledgement to DistributionReceiveQueue A to confirm the transaction was processed properly.

At step 236, financial provider 110 receives request 195*c* comprising the second portion of transaction information. For example, the second portion of transaction information may indicate "yes, I am sure that I want to purchase X shares of [Company Name] stock." Financial provider 110 may receive request 195*c* at a data center other than West Coast data center 140*b* (the assigned data center). For example, request 195*c* may be received at East Coast data center 140*a* in the event that the West Coast data center 140*b* has failed or if the Internet has misbehaved and sent the message to the wrong data center 140. East Coast data center 140*a* may determine that it is not the assigned data center, for example, based on the tag described with respect to step 212.

The system may determine a multi-master approach at step 240. For example, the system may determine to proceed to one of either step 244, 248, or 252.

In step 244, the assigned data center (West Coast data center 140*b*) may be selected as the master to handle the transaction. For example, East Coast data center 140*a* may forward request 195*c* to West Coast data center 140*b*, and West Coast data center 140*b* may facilitate the transaction directly. When the West Coast data center 140*b* (the assigned data center) receives the second portion of the transaction, the local load balancer would determine from the geographic information tag that the session originally came from the West Coast data center 140*b* (that it is the assigned data center). The West Coast data center 140*b* would then execute the second portion of the transaction as the Master.

Alternatively, in step 248, the data center where the second portion of the transaction was received (East Coast data center 140*a*) may be configured as a proxy between user device 115 and the assigned data center (West Coast data center 140*b*). Accordingly, West Coast data center 140*b* may communicate indirectly with user device 115 by sending and receiving communications through East Coast data center 140*a* using tunnel 142. For example, if due to reasons beyond the control of the data centers 140, the second portion of the transaction is received by the East Coast data center, the local load balancer examines the session for the geographic information tag. In this case the 'tag' identifies the session as originally established with the West Coast data center. The East Coast data center based local load balancer then acts as a proxy for the user (for this part of the session) and forwards the request to the West Coast data center via an internal network that connects the two data centers. The Local Load Balancer at the West Coast data center receives the request from the Local Load Balancer at the East Coast data center and allows the execution of the second part of the transaction. It then returns the results of that transaction to the East Coast Local Load balancer—which in-turn returns the results to the user.

As another alternative, in step 252 East Coast data center 140*a* may be selected as the master to handle the transaction directly (independently of West Coast data center 140*b*). For example, in some embodiments, East Coast data center 140*a* may be selected as the master for the transaction in the event that West Coast data center 140*b* has failed or become overloaded. East Coast data center 140*a* may use the session information from step 220 and/or the synchronization data from step 232 to seamlessly resume the financial transaction where it left off. Thus, the financial transaction may proceed at the East Coast data center 140*a* without added delays and user interaction that would otherwise be required to re-authenticate the session and to determine the details of the transaction, such as the number of shares, company name, and so on.

In some embodiments, traffic managers may be used to determine if the second data center (rather than the assigned data center) should become the master in step 252. For example, the Global Traffic Managers (GTMs) at both data centers 140*a*, 140*b* are in communication with local load balancers at both the data centers 140*a*, 140*b*. This communication link enables the GTMs to be aware of the status (LIVE or DARK) of a particular business function in each data center 140 and also the status of both data centers 140 as a whole. Assuming that the West Coast data center suddenly becomes unavailable (goes DARK), the GTMs at both the data centers become aware of this status within a short time, such as within 30 seconds of this event. When the second portion of the transaction is received, let's assume at the East Coast data center, the GTM and the Local Load Balancer at the East Coast data center make no attempt to act as a proxy for this user/transaction (unlike the example given above with respect to step 248). Instead, the second part of the transaction is examined for evidence that the session was previously authenticated. If the answer of this examination is "yes," the session is allowed to execute in the East Coast data center.

At step 256, the financial transaction is facilitated in real-time based on the first portion and the second portion of transaction information. The transaction may be facilitated by West Coast data center 140*b* (e.g., if West Coast data center 140*b* was selected as the master), East Coast data center 140*a* (e.g., if West Coast data center 140*b* was selected as the master), or a combination (e.g., using a proxy configuration). The method then ends.

Modifications, additions, or omissions may be made to the systems described herein without departing from the scope of the invention. The components may be integrated or separated. Moreover, the operations may be performed by more, fewer, or other components. Additionally, the operations may be performed using any suitable logic comprising software, hardware, and/or other logic. As used in this document, "each" refers to each member of a set or each member of a subset of a set. A subset may include zero, one, or more members.

Modifications, additions, or omissions may be made to the methods described herein without departing from the scope of the invention. For example, the steps may be combined, modified, or deleted where appropriate, and additional steps may be added. Additionally, the steps may be performed in any suitable order without departing from the scope of the present disclosure.

Although the description describes communications between two data centers for purposes of example and explanation, the systems and methods disclosed may be scaled to any suitable number of data centers.

Although the present invention has been described in detail, it should be understood that various changes, substitutions, and alterations can be made hereto without departing from the scope of the invention as defined by the appended claims.

What is claimed is:

1. A system, comprising:
   a plurality of data centers associated with a financial service provider, the plurality of data centers comprising an assigned data center and a second data center, the assigned data center and the second data center communicatively coupled via a communication link; the assigned data center configured to:
   receive a request from a user device requesting to establish a session with the financial service provider via one or more of the plurality of data centers; determine that the session passes authentication; generate session information indicating that the session passes authentication;
   communicate the session information to the second data center via the communication link;
   receive a first message from the user device, the first message comprising a first portion of transaction information for a financial transaction;
   store the first portion of transaction information within the assigned center; copy the first portion of transaction information as synchronization data; communicate the synchronization data to the second data center so that both the assigned data center and the second data center have the same first portion of transaction information, the synchronization data communicated via the communication link;
   the second data center configured to:
   receive a second message from the user device, the second message comprising a second portion of transaction information for the financial transaction; and
   complete the financial transaction by acting on the first portion and the second portion of transaction information at the second data center or by causing the assigned data center to act on the first portion and the second portion of transaction information;
   wherein to communicate synchronization data to the second data center, the assigned data center is further configured to:
   provide the synchronization data to a DistributionSendQueue;
   determine to send the synchronization data to the second data center as a destination;
   communicate the synchronization data to a SendQueue configured to transmit the synchronization data;
   receive an acknowledgement at a ReceiveQueue; and
   determine, at a DistributionReceiveQueue, that the synchronization data was properly processed based on the acknowledgement; and
   wherein to complete the financial transaction by causing the assigned data center to act on the first portion and the second portion of transaction information, the second data center is configured to forward the second message to the assigned data center such that the financial transaction is completed directly through the assigned data center.

2. The system of claim 1, wherein to complete the financial transaction by causing the assigned data center to act on the first portion and the second portion of transaction information, the second data center is configured to act as a proxy such that the financial transaction is completed indirectly through the assigned data center.

3. The system of claim 1, wherein to complete the financial transaction by acting on the first portion and the second portion of transaction information at the second data center, the second data center is configured to use the synchronization data to determine the first portion of the transaction information.

4. The system of claim 1, wherein the second data center is further configured to determine the session passes authentication based on the session information communicated by the assigned data center and independently of re-performing authentication.

5. The system of claim 1, wherein the assigned data center corresponds to the data center located nearest to the user device.

6. Non-transitory computer readable storage media comprising logic, the logic when executed causes one or more processors of a second data center associated with a financial service provider to:
   receive session information indicating that an assigned data center has authenticated a session between a user device and the assigned data center, the assigned data center associated with the financial service provider;
   receive synchronization data from the assigned data center, the synchronization data comprising a first portion of transaction information for a financial transaction associated with the user device;

receive a message from the user device, the message comprising a second portion of transaction information for the financial transaction; and complete the financial transaction by:
- acting on the first portion and the second portion of transaction information; or
- causing the assigned data center to act on the first portion and the second portion of transaction information;

wherein to receive the synchronization data, the logic, when executed, causes the one or more processors to:
receive the synchronization data at a ReceiveQueue; generate an acknowledgement and
provide the acknowledgement to a SendQueue configured to communicate the acknowledgement to the assigned data center and wherein to complete the financial transaction by causing the assigned data center to act on the first portion and the second portion of transaction information, the logic, when executed, causes the one or more processors to forward the message to the assigned data center.

7. The media claim 6, wherein to complete the financial transaction by causing the assigned data center to act on the first portion and the second portion of transaction information, the logic, when executed, causes the one or more processors to proxy the financial transaction on behalf of the assigned data center.

8. The media of claim 6, wherein to complete the financial transaction by acting on the first portion and the second portion of transaction information, the logic, when executed, causes the one or more processors to determine the first portion of the transaction information from the synchronization data and complete the transaction independently of the assigned data center.

9. The media of claim 8, the logic, when executed, further causes the one or more processors to determine the session passes authentication based on the session information and independently of re-performing authentication.

10. The media of claim 6, the logic, when executed, further causes the one or more processors to determine the assigned data center has been designated based on a tag, the tag indicating the assigned data center is located geographically closer to the user device than the second data center.

11. A method in a second data center, the second data center associated with a financial service provider, the method comprising:
receiving, by the second data center, session information indicating that an assigned data center has authenticated a session between a user device and the assigned data center, the assigned data center associated with the financial service provide;

receiving, by the second data center, synchronization data, the synchronization data received from the assigned data center and comprising a first portion of transaction information that the assigned data center received from the user device, the first portion of transaction information associated with a financial transaction;

receiving, by the second data center, a message from the user device, the message comprising a second portion of transaction information associated with the financial transaction; and completing, by the second data center, the financial transaction by:
- acting on the first portion and the second portion of transaction information at the second data center; or
- causing the assigned data center to act on the first portion and the second portion of transaction information;

wherein receiving the synchronization data comprises:
receiving the synchronization data at a ReceiveQueue;
generating an acknowledgement; and
providing the acknowledgement to a SendQueue configured to communicate the acknowledgement to the assigned data center;

wherein causing the assigned data center to act on the first portion and the second portion of transaction information comprises forwarding the second message to the assigned data center.

12. The method of claim 11, wherein causing the assigned data center to act on the first portion and the second portion of transaction information comprises:
configuring the second data center as a proxy; and
facilitating the transaction indirectly through the assigned data center using the second data center as a proxy.

13. The method of claim 11, wherein acting on the first portion and the second portion of transaction information at the second data center comprises:
determining the first portion of the transaction information from the synchronization data; and
facilitating the transaction directly through the second data center.

14. The method of claim 13, wherein facilitating the transaction directly through the second data center comprises determining the session passes authentication based on the session information and independently of re-performing authentication.

15. The method of claim 11,
wherein the assigned data center corresponds to one of a plurality of data centers associated with the financial service provider, the assigned data center located nearest to the user device.

* * * * *